E. OLIVER.
DEMOUNTABLE RIM.
APPLICATION FILED MAR. 6, 1920.
1,372,537.
Patented Mar. 22, 1921.
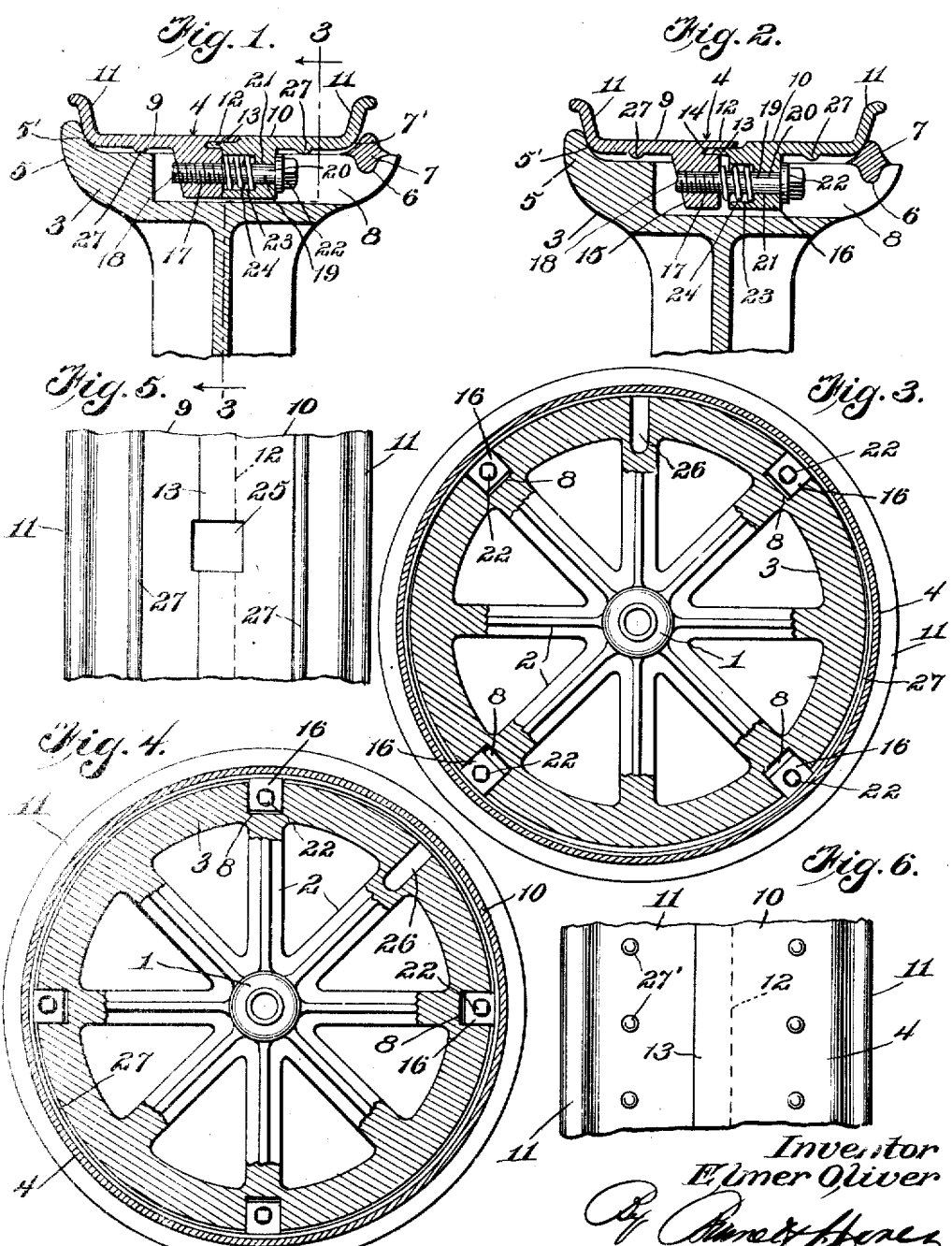
Inventor
Elmer Oliver

UNITED STATES PATENT OFFICE.

ELMER OLIVER, OF DAYTONA, FLORIDA.

DEMOUNTABLE RIM.

1,372,537.   Specification of Letters Patent.   Patented Mar. 22, 1921.

Application filed March 6, 1920. Serial No. 363,655.

*To all whom it may concern:*

Be it known that I, ELMER OLIVER, a citizen of the United States, residing at Daytona, in the county of Volusia and State of Florida, have invented new and useful Improvements in Demountable Rims, of which the following is a specification.

This invention relates to demountable tire-carrying rims for automobile wheels, and, while adapted for general use, is more particularly intended for use in conjunction with the wheels of auto-trucks and like heavy vehicles, in which, on account of the size and weight of the rim and tire, difficulty is experienced in fitting the valve stem in position and applying the rim and tire fitted thereon to the wheel rim.

One object of my invention is to provide a construction whereby the demountable rim may be applied and removed without the necessity of tilting the same to insert the valve in and withdraw it from its receiving opening in the wheel rim, and whereby, in the operation of applying the demountable rim, said rim will be automatically centered on the wheel rim, thereby eliminating a considerable amount of labor and trouble in handling and adjusting a heavy demountable rim and tire and effecting a considerable saving of time in applying and removing the demountable rim and tire.

A further object of the invention is to provide simple, reliable and efficient means for automatically centering and clamping the demountable rim in operative position and for coupling the demountable rim sections to permit ready and convenient connection and disconnection thereof and to secure certain desirable rim spreading and locking actions.

In a prior application filed November 17, 1919, Serial No. 338,585, I have shown wheel and tire-carrying rims embodying certain features disclosed in the present application and in which prior application the sectional demountable rim *per se* and its fastening connection and coacting parts of the wheel rim are claimed, the claims of the present application being directed generally to those features of construction coöperating to automatically center and clamp the demountable rim to the wheel rim.

The invention consists of the features of construction, combination and arrangement of parts, hereinafter fully described and claimed, reference being had to the accompanying drawing, in which:—

Figure 1 is a transverse section through a wheel rim and a demountable rim embodying my invention, showing the demountable rim sections as they appear prior to their spreading and automatic rim centering and clamping actions.

Fig. 2 is a view similar to Fig. 1 showing the demountable rim sections spread and disposed in centered and clamping position.

Fig. 3 is a sectional view taken through the wheel at right angles to its axis and showing the parts as they appear in Fig. 1.

Fig. 4 is a view similar to Fig. 3 showing the parts as they appear in Fig. 2.

Fig. 5 is a plan view on an enlarged scale of a portion of the inner face of the demountable rim.

Fig. 6 is a view similar to Fig. 5 showing a modification in the spacing and supporting means upon the inner face of the demountable rim.

Referring now more particularly to the drawing, 1 designates the hub, 2 the spokes and 3 the felly or fixed rim of a cast metal wheel, to which my invention is shown in the present instance applied, the said rim 3 having its peripheral portion suitably formed to provide a transversely broad seat face to receive the demountable rim 4. One side of the fixed rim 3 is provided with a fixed retaining flange 5 against and on which one side of the demountable rim bears, the opposite side of said rim 3 being flangeless to permit of the application and removal of the demountable rim, and being formed with an annular channel or groove 6 to receive a split locking or retaining ring 7 against and on which the opposite side of the demountable rim bears, said demountable rim being thereby held in position upon the fixed rim against lateral displacement. These elements 5 and 7 are provided with inclined or curved cam surfaces 5' and 7', respectively, for a purpose hereinafter described. Formed at proper intervals in the rim 3 are transverse receiving recesses 8, which recesses extend partially across the face of said rim and open through said face and through the side of the rim provided with the channel or groove 6.

The demountable rim 4 comprises a circumferentially split channeled rim body formed of separable sections 9 and 10 provided at their relatively outer edges with tire retaining flanges 11 which may be of a form to receive either a straight-side tire or of a form to receive and interlock with the beads of a clencher tire. The inner edges of the said rim sections are fitted for sliding transverse adjustment, and to this end are provided with overlapping flanges 12 and 13 adapted to close the intervening joint to a sufficient extent to obviate liability of pinching the inner tube of the tire, the flange 13 of the section 10 engaging a groove 14 in the section 9, whereby the flanges are held in guided engagement with each other.

For the purpose of holding the rim 4 against circumferential movement and connecting the rim sections 9 and 10 for certain adjustments and for holding a tire in position thereon when said rim is off the wheel, the said sections 9 and 10 are provided at intervals with transversely alined pairs of lugs 15 and 16, which lugs correspond in arrangement to and are adapted to fit within the recesses 8 of the rim 3 and to abut against the transverse walls thereof and thereby assist in holding the rim 4 from circumferential movement. Each lug 15 is provided with a threaded opening 17 to receive the threaded end 18 of a coupling bolt 19, which bolt 19 has its opposite end 20 smooth surfaced and extending through an opening 21 in the lug 16 for rotary and sliding engagement therewith, the latter-named end of the bolt being also provided with a head 22 to bear against the outer surface of the lug 16 and of suitable form to receive a wrench or other tool, whereby the bolt may be tightened and loosened. The bolts 19 are adapted to engage with the lugs and be tightened up, as shown in Fig. 1, to hold the rim sections 9 and 10 closed together, and fixedly related for holding a tire in inflated condition when off the wheel rim. The bolts are also adapted to be disconnected from the lugs to permit the rim sections to move out of engagement with each other and to fall apart for the purpose of freeing the tire held thereby, whereby the tire may be quickly and conveniently removed from the demountable rim. The bolts are further adapted to be slackened, as shown in Fig. 2, to permit the rim sections 9 and 10 to spread or slide outwardly to any determined degree, for certain automatic rim centering and binding or clamping actions, as hereinafter described, and in this adjustment the rim sections 9 and 10 are free to have such relative sliding motions transversely of the rim 3 so as to adapt them to accommodate themselves to the surfaces 5' and 7' of the fixed flange 5 and clamping ring 7 in order to secure a reliable and effective frictional binding or clamping action between the demountable rim and the said clamping elements when the demountable rim and tire are mounted for use upon the fixed rim. If desired, the lug 16 may be formed with a socket 23 to receive and house a coiled spring 24 which is adapted to be compressed and placed under tension when the bolt is tightened, as shown in Fig. 1, for reaction when the bolt is loosened to hold the rim sections spread to the desired degree and to assist the tire in maintaining the rim sections in spread condition under the tire pressure, as hereinafter described. The bolt heads 22 are arranged so as to be readily accessible from the outer side of the fixed rim through the outer ends of the recesses 8, into which the wrench or other tool may be introduced for the purpose of adjusting the same.

The rim sections 9 and 10 are provided in their inner edges with mating notches to form an opening 25 for the reception and passage of the valve stem of the pneumatic tire, not shown, which stem is adapted to fit within a radial recess 26 formed in the outer side of the wheel rim 3. The said recess 26 may extend partially into one of the spokes 2 so as to make the recess of adequate length to receive the valve stem. By this arrangement the rim 4 and the tire held thereby may be applied to and removed as a unit from and via the flangeless side of the rim 3, in which operation the valve stem simply slides into and out of the recess 26, thus obviating the necessity of extending the valve stem through the usual type of opening at the center of the fixed rim. This obviates the necessity of tilting the demountable rim in the customary way for the purpose of inserting or withdrawing the valve stem from its receiving opening, a difficult operation, especially in applying and removing the demountable rims and tires of trucks and other heavy vehicles, on account of the width of the fixed rim and the size and weight of the demountable rim and tire. The rim sections 9 and 10 are preferably provided on their inner faces with spacing and reinforcing members, shown in Figs. 1 to 5, inclusive, in the form of annular ribs 27, and in Fig. 6 in the form of annular series of spaced studs 27'. These spacing and reinforcing members serve at all times to keep the inner faces of said rim sections spaced from and out of contact with the face of the rim 3, to assist in centering the demountable rim on the wheel 3 in the operation of applying the demountable rim, and to reduce the mount of frictional contact between the rim surfaces in the operations of applying and removing a demountable rim as hereinafter described. In applying the rim 4 the ribs 27 also incidentally act as scrapers, thus removing all small particles of rust or other small surface particles from the face of the rim 3 so as to allow the rim 4 to be applied and removed with greater facility. The ribs 27, and also the studs 27' to a certain extent, furthermore have a bracing action and tend to prevent the rim sections 9 and 10 from warping or becoming bent, an objection present in demountable rims of ordinary construction.

In applying a tire to the rim 4, when the latter is off the wheel, the sections of said rim are disassociated, the rim section 9 laid with its flanged side 11 downward on the floor or ground, after which the tire is slipped from the opposite side of said rim section over upon the same. The rim section 10 is then inserted into the tire so that its flange 13 will engage the groove 14, and then the bolts 19 and coacting parts are fitted in position upon the lugs 15 and 16 and said bolts tightened up to hold the rim sections 9 and 10 connected and closed or with their inner edges in abutting contact, as shown in Fig. 1. The tire is then inflated to a pressure slightly greater than it is intended to carry when on the wheel and the tire and rim 4 may be carried as a spare, or the rim 4 with the tire applied thereto may be slid for use over upon the wheel rim 3 via the flangeless side of the latter until it abuts against and rests on the flange 5. The split retaining ring 7 is then fitted in the groove 6. At this stage the flange 11 of the outer section 10 of the rim 4 will lie inwardly of and out of contact with the ring 7, since when the rim sections 9 and 10 are fully closed together, or with their lapping edges in full lapped position, the rim 4 is narrower than the distance between the flange 5 and ring 7. At this stage also the rim 4, as shown in Fig. 3, is arranged eccentric to the surface of the rim 3, since the portions of the spacing flanges 27 or studs 27' at the top of the rim 4 rest on the rim 3, while the lower portion of the rim 4 is spaced to an abnormal degree from the lower portion of the face of the rim 3. In such position, therefore, the rim 4 is not properly centered with relation to the axis of the wheel and surface of the rim 3 and a proper centering is desirable before the rim 4 is fixed in working position. Such centering action is obtained in wheels of ordinary construction by the insertion and spreading action of wedge fasteners, but this is not always accurate and involves some labor, inconvenience and difficulty especially when large and heavy rims and tires are handled. My invention, however, secures an automatic centering action, as I will now proceed to describe. The rim 4 and tire carried thereby having been thus applied, the bolts 20 are then slackened sufficiently to permit the rim sections 9 and 10 to spread apart under the excess pressure in the tire and expansion of the springs 24, as shown in Fig. 2, whereby the flange 11 of the rim section 10 will be brought into binding engagement with the split ring 7, and both flanges will be airlocked and spring-locked in engagement with the flange 5 and ring 7, thus securing a frictional binding engagement which firmly clamps the rim 4 on the rim 3. Hence it will be seen that the internal pressure of the tire, or such pressure conjointly with the pressure of the springs 24, will be utilized to hold the demountable rim in position on the fixed rim. It will also be evident that the effect of the spreading of the rim sections 9 and 10 is to cause the flanged outer edges thereof to ride upwardly upon the inclined or cam surfaces 5' and 7' of the flange 5 and split ring 7, thus lifting the rim 4 and automatically centering said rim on the rim 3. The ribs 27 or studs 27' are, therefore, spaced at all points more or less equally from the face of the rim 3 and the flanged portions of the rim sections 9 and 10 brought to bind against and rest upon the flange 5 and ring 7, by which means the rim 4 will be properly supported upon the wheel 3 but spaced from the latter in order to prevent the rim surfaces from rusting or otherwise binding or sticking together. It will, of course, be understood that the effect of the spreading pressure of the air in the tire on the rim sections 9 and 10 will maintain said rim sections in binding engagement with the sides of the fixed rim, thus holding the demountable rim from lateral or circumferential displacement, circumferential movement or creeping being also prevented by the engagement of the lugs 15 and 16 with the walls of the recesses 8. When the rim sections 9 and 10 are free for spreading action, the elasticity of the tire itself, without air pressure, is sufficient to spread said rim sections to press the flanges 11 with some force into engagement with the flange 5 and ring 7, but, in the event that the tire should become entirely deflated, the pressure of the springs 24 will be sufficient to maintain the binding engagement. It will furthermore be evident that the air and spring pressure allows a certain yielding adjustment of the rim sections 9 and 10 to compensate for any tendency to looseness of contact incident to wear and tear, thus avoiding the objectionable noises due to imperfect contact between the clamping parts in the use of adjustable wedge fasteners of the type commonly employed.

In removing the demountable rim and tire, the bolts 19 are tightened to close the rim sections 9 and 10, as shown in Fig. 1, thus removing the pressure of the rim section 10 from the ring 7, allowing said ring to be readily detached without interference from the demountable rim, whereupon the demountable rim and tire, with the demountable rim sections closed together, may be

Having thus fully described my invention, I claim:—

1. A wheel rim having a fixed flange at one side, a removable retaining ring at the opposite side of the fixed rim, said flange and ring being provided with inclined or cam surfaces, a circumferentially divided demountable rim adapted to embrace the face of the fixed rim and normally of less width than the distance between the inclined or cam faces of the flange and ring when the sections of said demountable rim are in closed condition, fastening members detachably and adjustably connecting the sections of the demountable rim, and springs coöperating with said connections to spread the sections of the demountable rim when said fastening connections are adjusted to a prescribed position.

2. A wheel rim having a fixed flange at one side, a removable retaining ring at the opposite side of the fixed rim, a circumferentially divided tire carrying rim adapted to fit upon the fixed rim, said demountable rim being normally of less width than the distance between the flange and ring, fastening connections between the demountable rim sections for holding said sections assembled and adapted for adjustment to permit said rim sections to spread under tire pressure for respective engagement with the fixed flange and retaining ring, said fixed flange and retaining ring being provided with inclined or cam surfaces upon which the outer edges of the demountable rim sections are adapted to ride and bear to shift said demountable rim in its applying action from a position eccentric to the axis of the fixed rim to a position substantially concentric with the axis thereof, and contact members upon the demountable rim sections normally spaced from the surface of the fixed rim, the portions of said contact members at the top of the demountable rim being adapted to rest upon the surface of the fixed rim when said demountable rim is eccentric to the fixed rim and before the demountable rim sections are spread by tire pressure, and to be moved out of contact with said fixed rim in the riding contact of the demountable rim sections with said inclined or cam surfaces in the shifting of the demountable rim to a concentric position.

3. A wheel rim having a fixed retaining flange at one side, a removable retaining ring at the opposite side of the wheel rim, a demountable rim composed of circumferentially divided sections adapted to embrace the wheel rim and normally of less width than the distance between the flange and ring when the sections thereof are in closed position, and fastening connections for holding the demountable rim sections assembled and in closed position and for adjusting the same to permit said demountable rim sections to spread under tire pressure, said fixed flange and removable retaining ring being provided with inclined or cam surfaces upon which the outer edges of the demountable rim sections are adapted to ride and bear to automatically shift the demountable rim from an eccentric to a concentric position on the wheel rim and to support said demountable rim in a concentric position with the opposed faces of said rims clear of contact.

In testimony whereof I affix my signature.

ELMER OLIVER.